United States Patent
Kuo

(10) Patent No.: US 8,317,918 B1
(45) Date of Patent: Nov. 27, 2012

(54) DEFOAMERS FOR HYDRATABLE CEMENTITIOUS COMPOSITIONS

(75) Inventor: Lawrence L. Kuo, Acton, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 13/455,664

(22) Filed: Apr. 25, 2012

Related U.S. Application Data

(62) Division of application No. 12/786,881, filed on May 25, 2010, now Pat. No. 8,187,376.

(51) Int. Cl.
*C04B 7/00* (2006.01)
*C04B 16/00* (2006.01)
*C04B 24/00* (2006.01)
*C04B 40/00* (2006.01)
*C04B 28/02* (2006.01)
*C04B 24/26* (2006.01)
*C08K 3/00* (2006.01)

(52) U.S. Cl. ............ 106/808; 106/819; 106/823; 524/4; 524/5

(58) Field of Classification Search .................. 106/808, 106/819, 823
See application file for complete search history.

(56) References Cited

U.S. PATENT DOCUMENTS

| | | | |
|---|---|---|---|
| 3,654,370 A | 4/1972 | Yeakey et al. | |
| 3,660,319 A | 5/1972 | Yeakey et al. | |
| 3,832,402 A | 8/1974 | Yeakey et al. | |
| 4,075,130 A | 2/1978 | Naylor et al. | |
| 4,729,850 A | 3/1988 | Frentzel | |
| 4,948,429 A | 8/1990 | Arfaei | |
| 4,956,119 A | 9/1990 | Friel et al. | |
| 5,156,679 A | 10/1992 | Gartner et al. | |
| 5,275,744 A * | 1/1994 | Ho .................................. | 507/246 |
| 5,494,516 A * | 2/1996 | Drs et al. ...................... | 106/819 |
| 5,556,460 A | 9/1996 | Berke et al. | |
| 5,603,760 A | 2/1997 | Berke et al. | |
| 5,604,273 A | 2/1997 | Kerkar et al. | |
| 5,618,344 A | 4/1997 | Kerkar et al. | |
| 5,662,558 A | 9/1997 | Shannon | |
| 5,665,158 A | 9/1997 | Darwin et al. | |
| 5,725,657 A | 3/1998 | Darwin et al. | |
| 5,779,788 A | 7/1998 | Berke et al. | |
| 6,139,623 A | 10/2000 | Darwin et al. | |
| 6,277,191 B1 | 8/2001 | Budiansky et al. | |
| 6,387,872 B1 | 5/2002 | Bolzoni | |
| 6,441,054 B1 | 8/2002 | Ou et al. | |
| 6,545,067 B1 * | 4/2003 | Buchner et al. .................... | 524/2 |
| 6,569,924 B2 | 5/2003 | Shendy et al. | |
| 6,680,348 B1 | 1/2004 | Amaya et al. | |
| 6,803,396 B2 | 10/2004 | Gopalkrishnan et al. | |
| 6,858,661 B2 | 2/2005 | Zhang et al. | |
| 6,875,801 B2 | 4/2005 | Shendy et al. | |
| 7,662,882 B2 | 2/2010 | Lorenz et al. | |
| 2002/0107310 A1 | 8/2002 | Shendy et al. | |
| 2003/0187100 A1 | 10/2003 | Bury et al. | |
| 2003/0187101 A1 | 10/2003 | Shendy et al. | |
| 2009/0258970 A1 | 10/2009 | Kohler et al. | |

FOREIGN PATENT DOCUMENTS

EP 0415799 A2 3/1991

OTHER PUBLICATIONS

Young, Form PCT/ISA/210, International Search Report for PCT/US2011/036816, Aug. 12, 2011, 3 pages.
Young, Form PCT/ISA/237, Written Opinion of the International Searching Authority for PCT/US2011/036816, Aug. 12, 2011, 7 pages.

* cited by examiner

*Primary Examiner* — Anthony J Green
*Assistant Examiner* — Karam Hijji
(74) *Attorney, Agent, or Firm* — Craig K. Leon; Stephen P. Williams

(57) ABSTRACT

The present invention discloses additive compositions, cementitious compositions, and methods for controlling air in cementitious compositions, wherein a polyalkoxylated polyalkylene polyamine defoamer is deployed in combination with one or more air-entraining agents, such as higher alkanolamines, water-reducing agents including oxyalkylene-containing superplasticizers, or other air entraining agents.

12 Claims, No Drawings

DEFOAMERS FOR HYDRATABLE CEMENTITIOUS COMPOSITIONS

This application is a divisional based on Ser. No. 12/786,881 filed May 25, 2010 now U.S. Pat. No. 8,187,376, Feb. 29, 2012.

FIELD OF THE INVENTION

This invention relates to air management in hydratable cementitious materials such as concrete, and more particularly to the use of a polyalkoxylated polyalkylene polyamine defoamer in combination with one or more air-entraining agents for controlling air in cementitious compositions.

BACKGROUND OF THE INVENTION

A certain amount of entrained air is necessary for improving the freeze-thaw durability of concrete, which is a brittle material. However, the nature and extent of air entrainment must be carefully controlled because excessively large or unevenly spaced air voids within the concrete can lead to loss of freeze-thaw durability and compressive strength. Air entraining agents such as rosins and anionic surfactants are commonly used to control the size and spacing of air voids within the cementitious mix.

In European Patent EP 0 415 799 B1 (owned by the common assignee hereof), Gartner et al. taught that additions to cementitious compositions of a higher alkanolamine, such as triisopropanolamine ("TIPA"), enhanced late strength (e.g., at 28 days) but also increased the amount of air entrained in the cementitious composition. Analysis of various cement samples revealed an increase in air entrainment of about two percent when compared to cement that did not contain TIPA. Gartner et al. suggested using air-detraining nonionic surfactants, which included phosphates (e.g., tributylphosphate), phthalates (e.g., diisodecylphthalate), and polyoxypropylene-polyoxyethylene block copolymers. See EP 0 415 799 B1 at Page 6, lines 40-53.

In U.S. Pat. No. 5,156,679 (owned by the common assignee hereof), Gartner et al. taught the use of water-soluble alkylated alkanolamine salts for detraining air in concrete. These materials included N-alkylalkanolamine and N-alkylhydroxylamine. When TIPA was added to a mortar mix in the amount of 0.02% by weight as part of the water of hydration along with 0.01% by weight of dibutylamino-2-butanol ("DBAB") as a defoamer, the mortar mix demonstrated a reduction in air entrainment (Col. 5, line 51-Col. 6, line 14).

When concrete is formed, it requires mixing of the various components such as hydraulic cement, sand, gravel, water, and possibly additives to form a substantially uniform mixture. During mixing, air becomes entrapped in the composition, and much of this air remains in the resultant cured composition in the form of air voids. If air void size is small, the mix is said to be "air entrained." In most instances, a small amount of air entrainment is tolerated, and, in other instances, this is desirable for enhancing durability of the concrete in terms of resisting freeze/thaw cycles.

However, excessive air entrainment in the hydraulic cement composition will cause the resultant structure to have lower compressive strength than the mixture design is otherwise capable of attaining. There is an inverse relationship between air entrainment and compressive strength. It is generally believed that for each volume percent of air voids (bubbles) in a concrete mass, there exists a five percent loss of compressive strength. Hence, management of the air void content and nature is vitally important.

Water-reducing admixtures (including superplasticizers) are particularly known to entrain excessive air in the concrete slurry. The industry has attempted to correct this by using air-detraining agents (otherwise called defoamers herein) in the concrete mix. As with the cement grinding additives (e.g., TIPA) previously mentioned, common admixtures include hydrophobic materials such as nonionic surfactants with low hydrophilic-lipophilic balance (HLB), silicone derivatives, tributylphosphate, and alkyl phthalates.

However, defoamers with high hydrophobic properties have, as a consequence, very limited solubility in water, and are not easily incorporated into the aqueous solutions which make up the water-reducing admixtures. Their hydrophobic nature tends to destabilize the aqueous product by fostering separation of the components, and requires that the water-reducing admixture and defoamer be stored in separate tanks and mixed immediately before use; or, alternatively, that they be pre-mixed and constantly stirred to prevent separation.

In U.S. Pat. Nos. 5,665,158 and 5,725,657 (owned by the common assignee hereof), Darwin et al. disclosed the use of oxyalkylene amine-based defoaming agents for use with polycarboxylate superplasticizers. An alkoxypolyoxyalkylene ammonium polymer was ionically attached to the carboxylate portion of the comb polymer backbone to impart desired air controlling properties to the hydratable concrete being treated.

In U.S. Pat. No. 6,139,623 (owned by the common assignee hereof), Darwin et al. disclosed polycarboxylate superplasticizers emulsified with antifoaming agent using a surfactant to stabilize the emulsified superplasticizer and antifoaming agent. The antifoaming agent could be selected from phosphate esters (e.g., dibutylphosphate, tributylphosphate), borate esters, silicone derivates (e.g., polyalkyl siloxanes), and polyoxyalkylenes having defoaming properties.

In U.S. Pat. No. 6,858,661 (owned by the common assignee hereof), Zhang et al. disclosed a polycarboxylate water-reducer and a tertiary amine defoamer having an average molecular weight of 100-1500 for creating a stable admixture formulation and helping to achieve a controllable level of entrained air in the concrete mix.

In U.S. Pat. No. 6,545,067 (owned by BASF), Buchner et al. disclosed mixtures of polycarboxylate superplasticizer and butoxylated polyalkylene polyamine as a defoamer for reducing the air pore content of cement mixes.

In U.S. Pat. No. 6,803,396 (also owned by BASF), Gopalkrishnan et al. disclosed mixtures of polycarboxylate superplasticizer and air-detraining agents. The air detrainers were based on low molecular weight block polyether polymers described as containing ethylene oxide and propylene oxide units and described as being initiated using reactive diamine or glycol groups.

In U.S. Pat. No. 6,569,924 (owned by MBT Holding AG), Shendy et al. disclosed the use of polycarboxylate dispersants, a water-insoluble defoamer, and a solubilizing agents for solubilizing the water-insoluble defoamer. Such solubilizing agents functioned by increasing the amount of oil component within the aqueous phase. A similar approach was taken in U.S. Pat. No. 6,875,801 wherein Shendy et al. described using amine solubilizing agents for stabilizing water-insoluble defoamers.

Regardless of whether the defoamer is grafted onto a polymer dispersant or emulsified or rendered more water-soluble within the additive composition, the present inventor believes that a critical problem still remains with avoiding phase separation within the water-based additive formulation while retaining the efficacy of the defoamer to detrain air within the cementitious mixture being treated.

Accordingly, an improved defoamer additive composition is needed for improving the stability of air-entraining additives used in cement or concrete mixes without curtailing the effectiveness of the defoamer as an air-detraining agent. The present inventor believes that a new class of defoamers for use with air-entraining agents, such as higher trialkanolamines and water-reducing agents, is needed for controlling air content in cementitious materials, and also for providing different degrees of defoaming power, yet with increasing water compatibility that provides resistance to phase separation.

SUMMARY OF THE INVENTION

In surmounting the disadvantages of the prior art, the present invention provides a novel and inventive additive composition for controlling air in hydratable cementitious compositions. The term "additive" is used herein to refer to agents added at cement plants where clinker is interground to produce cement and also to refer to "admixtures" which are combined with cement, water, and aggregates to produce mortar or concrete.

The present invention involves the use of a defoamer that can be used alone with conventional air-entraining agents (e.g., higher alkanolamines such as TIPA), water-reducing agents such as oxyalkylene-containing superplasticizers), or in combination with existing defoamers (e.g., tributyl-phosphate).

Thus, an exemplary additive composition of the present invention for controlling air in hydratable cementitious compositions comprises:

(A) at least one agent operative to entrain air in a hydratable cementitious composition, said at least one agent comprising a higher trialkanolamine, a lignosulfonate, a naphthalene sulfonate, a melamine sulfonate, an oxyalkylene-containing superplasticizer, an oxyalkylene-containing shrinkage reducing agent, or mixture thereof;

(B) a polyalkoxylated polyalkylene polyamine defoamer having a structure represented by Formula (1)

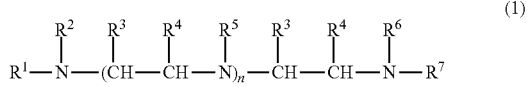
(1)

or salt thereof, or combination of said defoamer and salt thereof, wherein each of $R^1$, $R^2$, $R^3$, $R^4$, $R^5$, $R^6$, and $R^7$ independently represents a hydrogen, $C_1$-$C_4$ alkyl group, —$CH_2$—OH, or -(AO)$_x$—$R^8$ wherein AO represents propylene oxide ("PO") or a mixture of PO and ethylene oxide ("EO") wherein the molar ratio of PO to EO is at least 100:0 to 100:90; "x" represents an integer of 0 to 100; and $R^8$ represents hydrogen or an alkyl group; "n" represents an integer of 0 to 100; and wherein, if "n" is 0 then the amount of EO is less than 10% by weight based on total weight of said polyalkoxylated polyalkylene polyamine defoamer; and (C) the ratio of component A to component B is in the range of 5 to 100 by dry weight.

An exemplary cement composition of the invention comprises a hydratable cementitious binder and the foregoing additive composition, while an exemplary method of the invention comprises combining a hydratable cementitious binder with the foregoing additive composition.

Further advantages and features of the invention may be described in detail hereinafter.

DETAILED DESCRIPTION OF EXEMPLARY EMBODIMENTS

The term "cement" as used herein includes hydratable cement which is produced by pulverizing clinker consisting of hydraulic calcium silicates and one or more forms of calcium sulfate (e.g., gypsum) as an interground additive. "Mortars" are cement pastes formed with water and additionally including fine aggregate (e.g., sand), while "concretes" are mortars which additionally include coarse aggregate (e.g., crushed stones or gravel).

The term "cementitious" as used herein refers to materials that include or comprise cement (e.g., Portland cement) or which otherwise function as a binder to hold together fine aggregates (e.g., sand), coarse aggregates (e.g., crushed gravel), or mixtures thereof. Typically, Portland cement is combined with one or more other supplementary cementitious materials ("SCMs") and provided as a blend. SCMs may include limestone, hydrated lime, fly ash, granulated blast furnace slag, and silica fume, or other materials commonly included in such cements. Cementitious materials may therefore include one or more SCMs preferably in an amount of 0%-100%, more preferably 10%-60%, based on total dry weight of cementitious material.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate (3CaO.SiO$_2$ "C$_3$S" in cement chemists notation) and dicalcium silicate (2CaO.SiO$_2$, "C$_2$S") in which the former is the dominant form, with lesser amounts of tricalcium aluminate (3CaO.Al$_2$O$_3$, "C$_3$A") and tetracalcium aluminoferrite (4CaO.Al$_2$O$_3$.Fe$_2$O$_3$, "C$_4$AF"). See e.g., Dodson, Vance H., *Concrete Admixtures* (Van Nostrand Reinhold, New York N.Y. 1990), page 1.

As previously summarized, exemplary additive and cement compositions of the invention comprise the use of at least one agent comprising a higher trialkanolamine, lignosulfonate, a naphthalene sulfonate, a melamine sulfonate, an oxyalkylene-containing superplasticizer, an oxyalkylene-containing shrinkage reducing agent, or mixture thereof. The term "additive" shall be used herein to describe additives added at the cement manufacturing plant and also to describe "admixtures" which are added to cement, water, and optional aggregates used for making cement mortars, concretes, and other cementitious materials. Preferably, the additive compositions are aqueous liquids that may be dispensed (e.g., pump-metered) in liquid form.

The term "higher trialkanolamine" as used herein shall refer to tertiary amine compounds which are tri(hydroxyalkyl)amines having at least one $C_3$-$C_5$ hydroxyalkyl, and, more preferably, at least one $C_3$-$C_4$ hydroxyalkyl, group therein. The remaining (if any) hydroxyalkyl groups of the tertiary amine can be selected from $C_1$-$C_2$ hydroxyalkyl groups (preferably $C_2$ hydroxyalkyl). Examples of such compounds include hydroxyethyl di(hydroxypropyl)amine, hydroxypropyl di(hydroxyethyl)amine, tri(hydroxypropyl)amine, hydroxyethyl di(hydroxy-n-butyl)amine, tri(2-hydroxybutyl)amine, hydroxybutyl di(hydroxypropyl)amine, and the like. The preferred higher trialkanolamines are triisopropanolamine ("TIPA"), N,N-bis(2-hydroxyethyl)-N-(2-hydroxypropyl)amine ("DEIPA"), N,N-bis(2-hydroxypropyl)-N-(hydroxyethyl)amine ("EDIPA"), and tri(2-hydroxybutyl)amine. Mixtures of such higher trialkanolamines can be used, and any of these or a combination of these can be used with one or more of triethanolamine (TEA), diethanolamine (DEA), monoethanolamine, or mixtures thereof. When used as a grinding additive for Portland cement or blended cement, the higher trialkanolamines can be added in an amount up to 2%, preferably up to 0.1%, and most preferably between 0.005%-0.03% based on weight of the cement. In particular, TIPA is known for use as a late strength enhancer.

The terms "lignosulfonate," "naphthalene sulfonate," "melamine sulfonate," and "oxyalkylene-containing superplasticizer" are used herein to refer to water-reducing agents ("WRA") known to entrain air. A "lignosulfonate" WRA includes alkali metal or alkaline earth salts of lignosulfonic acid, such as calcium lignosulfonate, which is a commonly-used WRA. A "naphthalene sulfonate" WRA includes an alkali metal salt of a sulfonated naphthalene-formaldehyde condensate; while a "melamine sulfonate" WRA includes an alkali metal salt of a sulfonated melamine-formaldehyde condensate.

References to compounds in their salt form may be understood to include reference to their acid form, and vice-versa, because it may be the case that both acid and salt forms can co-exist within the aqueous environment. Similarly, it may also be understood that reference to compounds in their amine form may be understood to include reference to their ammonium form, and vice-versa.

The term "oxyalkylene-containing superplasticizer" will refer to water-reducing agents, typically comb polymers comprised of polycarboxylic acid or partial esters to which are attached pendant polyoxyalkylene groups. Such oxyalkylene groups include ethylene oxide (EO), propylene oxide (PO), and butylene oxide. Such oxyalkylene-containing superplasticizer will be any of those customarily used in the cement and concrete industries. For example, polymeric superplasticizers which are comb polymers having a carbon-containing backbone to which are attached polyoxyalkylene groups through amide, imide, ester, and/or ether linkages are contemplated for use in the present invention. Other examples of oxyalkylene-containing superplasticizers include copolymers of acrylic or methacrylic acid with the reaction product of acrylic acid or methacrylic acid with polyalkyleneglycol monomethyl ether. A further example of oxyalkylene-containing superplasticizers includes copolymers of acrylic acid or methacrylic acid with polyalkoxylated alcohols with typical alcohol chain lengths of $C_3$ to $C_{20}$.

Generally, the amount of air-entraining WRA used in the invention which is to be added to cement compositions will be in amounts of at least about 0.005 weight percent, and usually in the range of 0.005 to about 5 weight percent, and preferably 0.03 weight percent to about 1 weight percent based on the total weight of the cement or cementitious composition.

The term "oxyalkylene-containing shrinkage reducing agent" (hereinafter oxyalkylene-containing "SRA") refers to additives which are designed to inhibit drying shrinkage of cementitious compositions by maintaining or increasing air void content of the cementitious composition. Examples of oxyalkylene-containing SRAs and SRA formulated compositions are disclosed in U.S. Pat. Nos. 5,556,460; 5,604,273; 5,618,344; 5,779,788; and 5,622,558; 5,603,760; and 6,277,191, all of which are incorporated herein by reference. While many of the SRA compositions and formulations described in these patent references are useful for maintaining or controlling air content, the inventor believes that the use of the polyalkoxylated polyalkylene polyamine defoamer of the present invention can expand design possibilities of oxyalkylene SRAs in that smaller, more uniform air voids can be formed.

Thus, an exemplary additive composition of the invention for controlling air in hydratable cementitious compositions comprises:

(A) at least one agent operative to entrain air in a hydratable cementitious composition, said at least one agent comprising a higher trialkanolamine, a lignosulfonate, a naphthalene sulfonate, a melamine sulfonate, an oxyalkylene-containing superplastizicer, an oxyalkylene-containing shrinkage reducing agent, or mixture thereof; and (B) a polyalkoxylated polyalkylene polyamine defoamer having a structure represented by Formula (1)

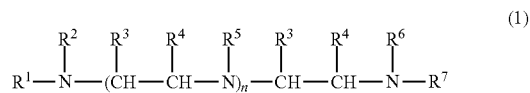

or salt thereof, or combination of said defoamer and salt thereof, wherein each of $R^1$, $R^2$, $R^3$, $R^4$, $R^5$, $R^6$, and $R^7$ independently represents a hydrogen, $C_1$-$C_4$ alkyl group, —$CH_2$—OH, or -$(AO)_x$—$R^8$ wherein AO represents propylene oxide ("PO") or a mixture of PO and ethylene oxide ("EO") wherein the molar ratio of PO to EO is at least 100:0 to 100:90; "x" represents an integer of 0 to 100; and $R^8$ represents hydrogen or an alkyl group; "n" represents an integer of 0 to 100; and wherein, if "n" is 0 then the amount of EO is less than 10% by weight based on total weight of said polyalkoxylated polyalkylene polyamine defoamer; and (C) the ratio of component A to component B is in the range of 5 to 100 by dry weight (and more preferably in the range of 14 to 70, and most preferably in the range of 20 to 50).

In preferred exemplary embodiments, the defoamer is made by polyalkoxylation of a polyalkylene polyamine. Exemplary polyalkylene polyamines suitable for use in the present invention include, but are not limited to, ethylene diamine, diethylene triamine, triethylene tetramine, tetraethylene pentamine, pentaethylene hexamine, propylene diamine, dipropylene triamine, tripropylene tetramine, tetrapropylene pentamine, pentapropylene hexamine, N,N-dimethylethylene diamine, N,N'-dimethylethylene diamine, N,N-dimethylpropylene diamine, N,N'-dimethylpropylene diamine, N,N-diethylethylene diamine, N,N'-diethylethylene diamine, N,N-diethylpropylene diamine, N,N'-diethylpropylene diamine. More preferred of these polyalkylene polyamines are ethylene diamine, diethylene triamine, triethylene tetramine, or mixtures thereof, with the most preferred being diethylene triamine.

In further exemplary embodiments, the polyalkylene polyamine may be alkoxylated by reacting it with ethylene oxide and propylene oxide. In still further exemplary embodiments, the polyalkylene polyamine may be alkoxylated by reacting it with ethylene oxide and propylene oxide wherein the molar ratio of propylene oxide to ethylene oxide is greater than 1. In another preferred embodiment, the amount of ethylene oxide groups is in the range of 0%-40% based on total weight of the polyethers, whereas the amount of polypropylene oxide groups is in the range of 60%-100% based on total weight of the polyethers.

In further exemplary embodiments, the polyalkoxylated polyalkylene polyamine defoamer of component B has a number-average molecular weight of 500-7000. More preferably, the number-average molecular weight is 1000-5000; and most preferably the number-average molecular weight is 2000-3500.

In further exemplary embodiments, the polyalkoxylated polyalkylene polyamine defoamer of component B is neutralized with an acid. The acid may be selected from formic acid, acetic acid, propionic acid, hydrochloric acid, nitric acid, sulfuric acid, or a mixture thereof. Preferably, the acid is formic acid or acetic acid. An exemplary acid which may be used for neutralizing the polyalkoxylated polyalkylene polyamine defoamer of component B may also be an oxyalkylene-containing superplasticizer.

The present invention also provides a method for controlling air in a cementitious composition which comprises combining a hydratable cementitious binder, such as cement (which may include supplemental cementitious materials), with the aforementioned polyalkoxylated polyalkylene polyamine defoamer.

Thus, an exemplary method of the present invention controlling air in cementitious compositions comprises combining a hydratable cementitious composition with an additive having (A) at least one agent operative to entrain air in a hydratable cementitious composition, said at least one agent comprising a higher trialkanolamine, a lignosulfonate, a naphthalene sulfonate, a melamine sulfonate, an oxyalkylene-containing superplasticizer, an oxyalkylene-containing shrinkage reducing agent, or mixture thereof;

(B) a polyalkoxylated polyalkylene polyamine defoamer having a structure represented by Formula (1)

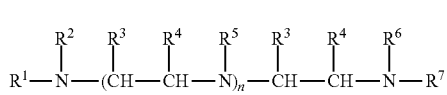

(1)

or salt thereof, or combination of said defoamer and salt thereof, wherein each of $R^1$, $R^2$, $R^3$, $R^4$, $R^5$, $R^6$, and $R^7$ independently represents a hydrogen, $C_1$-$C_4$ alkyl group, —$CH_2$—OH, or -(AO)$_x$—$R^8$ wherein AO represents propylene oxide ("PO") or a mixture of PO and ethylene oxide ("EO") wherein the molar ratio of PO to EO is at least 100:0 to 100:90; "x" represents an integer of 0 to 100; and $R^8$ represents hydrogen or an alkyl group; "n" represents an integer of 0 to 100; and wherein, if "n" is 0 then the amount of EO is less than 10% by weight based on total weight of said polyalkoxylated polyalkylene polyamine defoamer; and (C) the ratio of component A to component B is in the range of 5 to 100 by dry weight (and more preferably in the range of 14-70, and most preferably in the range of 20-50).

The present invention also pertains to cement compositions comprising a hydratable cementitious binder and the aforementioned polyalkoxylated polyalkylene polyamine defoamer which may be in amine form, ammonium salt form, or simultaneously in both forms, depending upon pH level and/or other factors.

The amount of the polyalkoxylated polyalkylene defoamer used will depend on the amount and nature of the one or more air-entraining agents used (Component (A)), but typically could be in the range of 0.05-5.0% based on weight of hydratable cement in the cementitious composition being treated.

In further exemplary methods and compositions of the inventions, one or more conventional defoamers may be combined with the polyalkoxylated polyalkylene polyamine in exemplary additive compositions, cement compositions and methods of the invention. Conventional defoamers that are contemplated for use in the present invention include tributylphosphate. Another such defoamer is bishydroxylpropyl tallow amine (a tertiary amine defoamer represented by the structural formula $R^1NR^2R^3$ wherein $R^1$ is hydrophobic and represents a $C_8$-$C_{25}$ group comprising a linear or branched alkyl, alkene, alkyne, alcohol, ester or oxyalkylene group (e.g., polyoxyalkylene) represented by the formula $R^4$-$(AO)_n$— or $R^4$—$(OA)_n$- wherein $R^4$ represents hydrogen or a $C_1$ to $C_{25}$ alkyl group, A represents a $C_1$ to $C_6$ alkyl group and "n" is an integer of 1 to 4; and $R^2$ and $R^3$ each represent a $C_1$-$C_6$ group comprising a branched or linear alkyl, alkene, alkyne, alcohol, ester or oxyalkylene group (e.g., polyoxyalkylene) represented by the formulae $R^4$-$(AO)_n$— or $R^4$ $(OA)_n$- wherein $R^4$ represents hydrogen or a $C_1$-$C_{25}$ alkyl group, A represents a $C_1$ to $C_6$ alkyl group, and "n" is an integer of 1 to 4; and wherein the average molecular weight of the tertiary amine defoamer is 100-1500 and more preferably 200-750.

Further exemplary defoamers include oxyalkylene amines. The general composition can be represented by structural formula $X_2N(BO)_zR$ wherein X represents hydrogen, $(BO)_z$ R, or mixtures thereof; R represents hydrogen, a $C_1$-$C_{10}$ alkyl group, or $BNH_2$ wherein B represents a $C_2$-$C_{10}$ alkylene group; and z represents an integer from 5 to 200.

Further exemplary defoamers may also be selected from the group consisting of a composition represented by the formula $(PO)(O$—$R)_3$ wherein R is a $C_2$-$C_{20}$ alkyl group, a borate ester, a silicone derivative, and EO/PO type defoamer. Still further exemplary defoamers may include ceto-stearyl alcohol ethoxylates and ceto-oleyl alcohol ethoxylates, specifically ethoxylated and proproxylated linear primary $C_{16}$-$C_{18}$ alcohols.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

Example 1

An aqueous mixture of a polycarboxylate dispersant and polyalkoxylated polyethylene polyamine was prepared to yield a solution wherein solids comprised 25% to 40% solution by total weight. The polymeric dispersant comprised a backbone having polycarboxylate groups and pendant polyethylene oxide groups. Polyethylene polyamines having different degrees of polypropoxylation, indicated in terms of the number of moles of propylene oxide per mole of polyamine, are provided in Table 1 below.

TABLE 1

| Additive sample | Polyamine | Propylene oxide/ polyamine (mol/mol) |
|---|---|---|
| 1 | Ethylenediamine | 40 |
| 2 | Ethylenediamine | 50 |
| 3 | Diethylene triamine | 40 |
| 4 | Diethylene triamine | 45 |
| 5 | Diethylene triamine | 50 |
| 6 | Triethylene tetramine | 40 |

In these experiments, polycarboxylate and polypropoxylated polyamine were mixed together at various weight ratios ranging from 20 to 50; the total concentration was 25 to 40 wt % in water. Each of the solutions was stirred for 15 to 30 minutes at ambient temperature and the pH of final solution ranged from 4-5. After being stored for 60 days at ambient conditions, the resultant solutions did not show any phase separation, indicating good storage stability.

Example 2

In this example, the defoaming property of various polypropoxylated polyamine additives was evaluated in a standard mortar test for slump and air content. Ordinary Portland cement X was used at a sand/cement/water ratio of 3/1/0.5. All tests were carried out in the presence of polycarboxylate dispersant A and an air-entraining agent. The dose of the dispersant was 0.13% by weight of cement and the ratio of dispersant to additive was 33:1 by weight. The air-entraining agent is commercially available from Grace Construction Products, Cambridge, Mass. under the trade name DAREX® II AEA. The air content was measured in accordance with ASTM C 185 and the workability was calculated using the equation, Workability=slump+(flow 1+flow 2)/2−100

Three different polypropoxylated polyamines were compared with the control and the results are shown in Table 2.

TABLE 2

| Additive | Workability (mm) | Air content (%) |
|---|---|---|
| None | 197 | 19.7 |
| 1 | 210 | 10.2 |
| 3 | 216 | 11.0 |
| 6 | 215 | 11.0 |

As compared to the control mix without additive, the lower air percentages for mixes using the additives clearly indicate that the polypropoxylated polyamines functioned as effective defoamers. The decreased air content also reflected in an increase in workability.

Example 3

The mortar test protocol described in Example 2 was repeated, except that ordinary Portland cement Y and polycarboxylate dispersant B were used. Five different defoamers were evaluated at different weight ratios to the polycarboxylate dispersant. In addition, the change in air content was measured as a function of time. The results are shown in Table 3.

TABLE 3

| Additive | Dispersant/ Additve | Workability (mm) | Air Content % at 9 min. | Air Content % at 25 min. | Air Content % at 40 min. |
|---|---|---|---|---|---|
| 1 | 29 | 219 | 16.4 | 14.1 | 11.6 |
| 2 | 40 | 221 | 11.5 | 10.3 | 8.7 |
| 3 | 33 | 218 | 17.8 | 15.5 | 12.7 |
| 5 | 33 | 211 | 11.7 | 10.8 | 9.0 |
| 6 | 33 | 225 | 12.4 | 10.8 | 9.5 |

The results in this example indicate that the air content can be tailored through a combination of selection of the type of polyalkylene polyamine, degree of polypropoxylation, and its concentration relative to the amount of dispersant.

Example 4

This example illustrates the effectiveness of the polypropoxylated diethylene triamine as a defoamer for three different types of polycarboxylate dispersants in concrete. When the defoamer was used, the dispersant and defoamer were mixed together at a weight ratio of 33:1.

Concrete mixes were fabricated using the following proportions: Portland cement X in the amount of 611 lb/yd$^3$, fine aggregate in the amount of 1330 lb/yd$^3$, coarse aggregate in the amount of 1650 lb/yd$^3$, and water in the amount of 278 lb/yd$^3$. Air content was tested in accordance with ASTM C231-97. Other concrete properties such as slump, strength and set time were tested to confirm that the concrete was in a reasonable range for experimental purposes. Both slump and air content were measured at 9 minute mark and the results are summarized in Table 4.

TABLE 4

| Polycarboxylate Dispersant (type) | % added to Cement | Additive | Slump (inches) | Air (%) |
|---|---|---|---|---|
| B | 0.12 | none | 7.50 | 6.4 |
| B | 0.12 | 4 | 6.00 | 3.3 |
| C | 0.12 | none | 7.75 | 8.7 |
| C | 0.12 | 4 | 7.00 | 4.2 |
| D | 0.12 | none | 8.75 | 7.3 |
| C | 0.12 | 4 | 7.50 | 3.6 |

Although each polycarboxylate dispersant entrapped different amount of air, the results in Table 4 clearly indicate that polypropoxylated diethylene triamine effectively reduced the air content by about 50%.

Example 5

This example demonstrates the function of polypropoxylated diethylene triamine and polypropoxylated triethylene tetramine as defoamer in air-entrained concrete.

The concrete test protocol was similar to that used in Example 4, except that a conventional air-entraining agent was also incorporated. A commercial air-entraining agent (commercially available from Grace Construction Products, Cambridge, Mass., under the trade name DARAVAIR® 1000) was used at 0.75 oz/cwt of cement.

Also in this example, polycarboxylate dispersant B was employed at the dosage of 0.11% by weight of cement and its weight ratio to additive was fixed at 50:1. Table 5 summarizes the results.

TABLE 5

| Polycarboxylate Dispersant (type) | % added to Cement | Additive | Slump (inches) | Air (%) |
|---|---|---|---|---|
| B | 0.11 | none | 8.75 | 8.8 |
| B | 0.11 | 3 | 8.00 | 5.8 |
| B | 0.11 | 5 | 7.75 | 4.9 |
| B | 0.11 | 6 | 8.00 | 6.2 |

The results in this table indicate that all three additives exhibited an air detraining (defoaming) ability in air-entrained concrete, and that for the same diamine, the air detraining power also increased with increasing degree of polypropoxylation.

Example 6

The defoaming effects of polypropoxylated ethylene diamine and polypropoxylated diethylene triamine were evaluated as a function of time in air-entrained concrete. The test protocol of Example 5 was used, and both slump and air content were measured at 9, 25, and 40 minute marks. An air-entraining agent, commercially available from Grace Construction Products under the trade name DAREX® II AEA, was used at a dosage of 0.20 oz/cwt of cement. Aqueous solutions of polycarboxylate dispersant B and additive were made at a weight ratio of 33:1. The results of the experiments are tabulated in Table 6.

TABLE 6

| Dispersant/ Additive | Additive | Slump (inches) at | | | Air Content (%) at | | |
|---|---|---|---|---|---|---|---|
| | | 9 min. | 25 min. | 40 min. | 9 min. | 25 min. | 40 min. |
| none | | 9.75 | 7.75 | 6.75 | 14.8 | 12.0 | 10.4 |
| 1 | 33 | 9.00 | 7.75 | 6.25 | 8.9 | 8.1 | 7.3 |
| 3 | 33 | 9.25 | 8.00 | 7.00 | 9.3 | 8.9 | 8.3 |

Compared to the control mix without additive, both polypropoxylated ethylene diamine and polypropoxylated diethylene triamine clearly demonstrated their defoaming properties over the course of the experiments.

The foregoing example and embodiments were present for illustrative purposes only and not intended to limit the scope of the invention.

It is claimed:

1. A method for controlling air in hydratable cementitious compositions, comprising: introducing to a cementitious binder
   (A) at least one agent operative to entrain air in a hydratable cementitious composition, said at least one agent comprising a higher trialkanolamine, a lignosulfonate, a naphthalene sulfonate, a melamine sulfonate, an oxyalkylene-containing superplasticizer, an oxyalkylene-containing shrinkage reducing agent, or mixture thereof;
   (B) a polypropoxylated polyalkylene polyamine defoamer formed by alkoxylating a polyalkylene polyamine with ethylene oxide, propylene oxide, or mixture thereof, wherein the amount of ethylene oxide groups is in the range of 0%-40% based on total weight of polyethers, and the amount of polypropylene oxide groups is in the range of 60%-100% based on total weight of polyethers, the molar ratio of propylene oxide to ethylene oxide being greater than 1, said polypropoxylated polyalkylene polyamine defoamer having a structure represented by Formula (1)

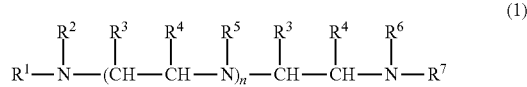
(1)

or salt thereof, or combination of said defoamer and salt thereof, wherein each of $R^1$, $R^2$, $R^3$, $R^4$, $R^5$, $R^6$, and $R^7$ independently represents a hydrogen, $C_1$-$C_4$ alkyl group, $-CH_2-OH$, or $-(AO)_x-R^8$, wherein at least one of $R^1$, $R^2$, $R^3$, $R^4$, $R^5$, $R^6$, and $R^7$ represents $-(AO)_x-R^8$ and wherein AO represents propylene oxide ("PO") or a mixture of PO and ethylene oxide ("EO") wherein the molar ratio of PO to EO is at least 100:0 to 100:90; "x" represents an integer of 4 to 100; and $R^8$ represents hydrogen or an alkyl group; "n" represents an integer of 0 to 100; and
   wherein, if "n" is 0 then the amount of EO is less than 10% by weight based on total weight of said polypropoxylated polyalkylene polyamine defoamer; and
   (C) The ratio of component A to component B is in the range of 5 to 100 by dry weight.

2. The method of claim 1 wherein said polyalkylene polyamine is selected from the group consisting of ethylene diamine, diethylene triamine, triethylene tetramine, tetraethylene pentamine, pentaethylene hexamine, propylene diamine, dipropylene triamine, tripropylene tetramine, tetrapropylene pentamine, pentapropylene hexamine, N,N-dimethylethylene diamine, N,N'-dimethylethylene diamine, N,N-dimethylpropylene diamine, N,N'-dimethylpropylene diamine, N,N-diethylethylene diamine, N,N'-diethylethylene diamine, N,N-diethylpropylene diamine, N,N'-diethylpropylene diamine.

3. The method of claim 1 wherein said polyalkylene polyamine is ethylene diamine, diethylene triamine, triethylene tetramine, or mixture thereof.

4. The method of claim 1 wherein said polyalkylene polyamine is diethylene triamine.

5. The method of claim 1 wherein "x" is an integer of 20 to 80.

6. The method of claim 1 wherein "x" is an integer of 35 to 60.

7. The method of claim 1 wherein said polyalkoxylated polyalkylene polyamine defoamer of component B has a number-average molecular weight of 500-7,000.

8. The method of claim 1 wherein said polyalkoxylated polyalkylene polyamine defoamer of component B has a number-average molecular weight of 1,000-5,000.

9. The method of claim 1 wherein said polyalkoxylated polyalkylene polyamine defoamer of component B has a number-average molecular weight of 2,000-3,500.

10. The method of claim 1 wherein the ratio of component A to component B is in the range of 14 to 70 by percentage weight based on total weight of said composition for controlling air.

11. The method of claim 1 wherein the ratio of component A to component B is in the range of 20 to 50 by percentage weight based on total weight of said composition for controlling air.

12. The method of claim 1 wherein said polyalkoxylated polyalkylene polyamine is neutralized with an acid.

* * * * *